United States Patent
Bao et al.

(10) Patent No.: US 10,015,716 B2
(45) Date of Patent: *Jul. 3, 2018

(54) SYSTEMS AND METHODS FOR PRESERVING APPLICATION IDENTIFICATION INFORMATION ON HANDOVER IN A COMMUNICATION NETWORK

(71) Applicant: Taiwan Semiconductor Manufacturing Co., Ltd., Hsinchu (TW)

(72) Inventors: Yiliang Bao, San Diego, CA (US); Kenneth Stanwood, Vista, CA (US); David Gell, San Diego, CA (US)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/225,214

(22) Filed: Aug. 1, 2016

(65) Prior Publication Data

US 2016/0345233 A1 Nov. 24, 2016

Related U.S. Application Data

(63) Continuation of application No. 14/718,412, filed on May 21, 2015, now Pat. No. 9,414,287, which is a (Continued)

(51) Int. Cl.
*H04W 36/30* (2009.01)
*H04W 36/00* (2009.01)
*H04W 72/12* (2009.01)

(52) U.S. Cl.
CPC ........ *H04W 36/30* (2013.01); *H04W 36/0011* (2013.01); *H04W 36/0016* (2013.01); (Continued)

(58) Field of Classification Search
CPC ...... H04W 80/04; H04W 36/18; H04W 36/14
See application file for complete search history.

(56) References Cited

U.S. PATENT DOCUMENTS

| | | |
|---|---|---|
| 2002/0191560 A1 | 12/2002 | Chen et al. |
| 2004/0038682 A1 | 2/2004 | Persson et al. |

(Continued)

OTHER PUBLICATIONS

Extended European Search Report dated Aug. 5, 2016 for related EP Patent Application No. 12187166.9.

*Primary Examiner* — Andrew Lai
*Assistant Examiner* — Zhiren Qin
(74) *Attorney, Agent, or Firm* — JCIPRNET

(57) ABSTRACT

Systems and methods preserve application identification information on handover in a communication network. End user quality of experience is improved by determining applications associated with communications to and from the end user. The applications may include application classes and specific applications. The application information is used to schedule packets such that the end user quality of experience is improved for that application. When the end user is handed over between wireless access nodes, the access nodes transfer application information so that the improved end user quality of experience is maintained.

14 Claims, 7 Drawing Sheets

Related U.S. Application Data continuation of application No. 13/312,106, filed on Dec. 6, 2011, now Pat. No. 9,042,247.

(52) U.S. Cl.
CPC ... *H04W 36/0044* (2013.01); *H04W 72/1252* (2013.01); *H04W 72/1247* (2013.01)

(56) References Cited

U.S. PATENT DOCUMENTS

| | | |
|---|---|---|
| 2005/0286422 A1 | 12/2005 | Funato |
| 2006/0143669 A1* | 6/2006 | Cohen ................... H04N 7/173 725/90 |
| 2008/0140767 A1* | 6/2008 | Rao .................... H04L 65/1013 709/203 |
| 2009/0067328 A1* | 3/2009 | Morris ............. H04W 72/1242 370/230.1 |
| 2009/0201884 A1 | 8/2009 | Chaponniere et al. |
| 2010/0067400 A1 | 3/2010 | Dolganow et al. |
| 2010/0142486 A1* | 6/2010 | Wahlqvist ......... H04W 72/0406 370/332 |
| 2011/0064053 A1 | 3/2011 | Cha et al. |
| 2011/0201328 A1* | 8/2011 | Bowen ................. H04W 36/14 455/426.1 |
| 2011/0216664 A1 | 9/2011 | Okada et al. |
| 2011/0250891 A1 | 10/2011 | Zou et al. |
| 2012/0327778 A1 | 12/2012 | Stanwood et al. |

\* cited by examiner

SYSTEMS AND METHODS FOR PRESERVING APPLICATION IDENTIFICATION INFORMATION ON HANDOVER IN A COMMUNICATION NETWORK

CROSS-REFERENCE TO RELATED APPLICATIONS

This application is a continuation of U.S. application Ser. No. 14/718,412, filed May 21, 2015, which is a continuation of U.S. application Ser. No. 13/312,106 (now U.S. Pat. No. 9,042,247), filed Dec. 6, 2011, all of which are hereby incorporated by reference.

BACKGROUND

The present invention relates to the field of communication systems and to systems and methods for preserving application identification information on base station handover in communication systems.

In a capacity constrained, multiple-access communication network, two goals are omnipresent: the successful transfer of information and the minimization of one transfer from disrupting other transfers. Often these goals are in conflict with each other, and thus represent opportunity for system optimization.

Success in transferring information may be judged by how the user experiences the transfer. That is, the quality of the experience is a metric for judging successful transfer of information. A communication system can generally improve the user experience by avoiding disruptions or delays in the services provided to the user. The communication characteristics that provide a positive user experience may vary with the type of application associated with the information transfer. For example, for an email application, delay in delivering part of a message to the user is preferred to failing to deliver part of the message, whereas for a video conferencing application, dropping a portion of the video may be preferable to delaying its delivery.

Determination of the type of application associated with a given data packet is often complex. For example, a wireless access node may be simultaneously providing many diverse types of services to each of many users. The applications used change over time. Furthermore, additional challenges to providing improved quality user experiences occur in a mobile network when the wireless access node providing information transfers to a user changes.

SUMMARY

Systems and methods for preserving application identification information on handover in a communication network are provided. In one aspect, the invention provides a wireless access node comprising: a transmitter-receiver module configured to wirelessly communicate with user devices; a backhaul interface module configured to communicate with a core network element; and a processor module coupled to the transmitter-receiver module and the backhaul interface module and configured to analyze data packets to determine information about one or more characteristics of one or more applications associated with the data packets, at least some of the data packets being in a first set of the data packets that are associated with a data stream and associated with a first one of the user devices; segregate the data packets into scheduling groups, each scheduling group associated with at least one data queue; determine scheduling parameters (such as weights, priorities, credits, or debits) for the data queues, the scheduling parameters based at least in part on the characteristics of applications associated with the data packets in the corresponding data queues; schedule the data packets from the data queues for transmission from the wireless access node taking into account the scheduling parameters; determine that the first one of the user devices will be handed off to a second wireless access node; and transfer the information about characteristics of applications associated with the first set of data packets to the second wireless access node.

In another aspect, the invention provides a wireless access node comprising: a transmitter-receiver module configured to wirelessly communicate with user devices; a backhaul interface module configured to communicate with a core network element; and a processor module coupled to the transmitter-receiver module and the backhaul interface module and configured to segregate data packets into scheduling groups, each scheduling group associated with at least one data queue; determine scheduling parameters for the data queues, the scheduling parameters based at least in part on one or more characteristics of one or more applications associated with the data packets in the corresponding data queues; schedule the data packets from the data queues for transmission from the wireless access node taking into account the scheduling parameters; and receive information about one or more characteristics of an application associated with data packets associated with a data stream for one of the user devices that will be handed over to the wireless access node from a second wireless access node, the received information being used to determine the scheduling parameters for the data queues.

In another aspect, the invention provides a method for operating a wireless communication network, the method comprising: receiving data packets at a first wireless access node, some of the data packets being associated with a data stream and a first user device in communication with the first wireless access node; analyzing the data packets to determine information about characteristics of applications associated with the data packets; segregating the data packets into scheduling groups, each scheduling group associated with at least one data queue; determining scheduling parameters for the data queues, the scheduling parameters based at least in part on the characteristics of applications associated with the data packets in the corresponding data queues; scheduling the data packets from the data queues to an output queue taking into account the scheduling parameters; transmitting the data packets from the output queue; determining that the first user device will be handed off to a second wireless access node; transferring the information about characteristics of application associated with the data packets associated with the first user device from the first wireless access node to the second wireless access node; receiving further data packets associated with the data stream at the second wireless access node; and utilizing the transferred information about the characteristics of applications to transmit the further data packets from the second wireless access node.

In another aspect, the invention provides a method for use with handover of a user device in a wireless communication network, the method comprising: receiving data packets in a data stream at a first wireless access node for transmission to a user device; obtaining information for use in improving a quality of experience for a user of the user device; determining that the user device will be handed off to a second wireless access node; and transferring the information for use in improving a quality of experience for a user of the user device from the first wireless access node to the second wireless access node.

Other features and advantages of the present invention should be apparent from the following description which illustrates, by way of example, aspects of the invention.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Figure 1:
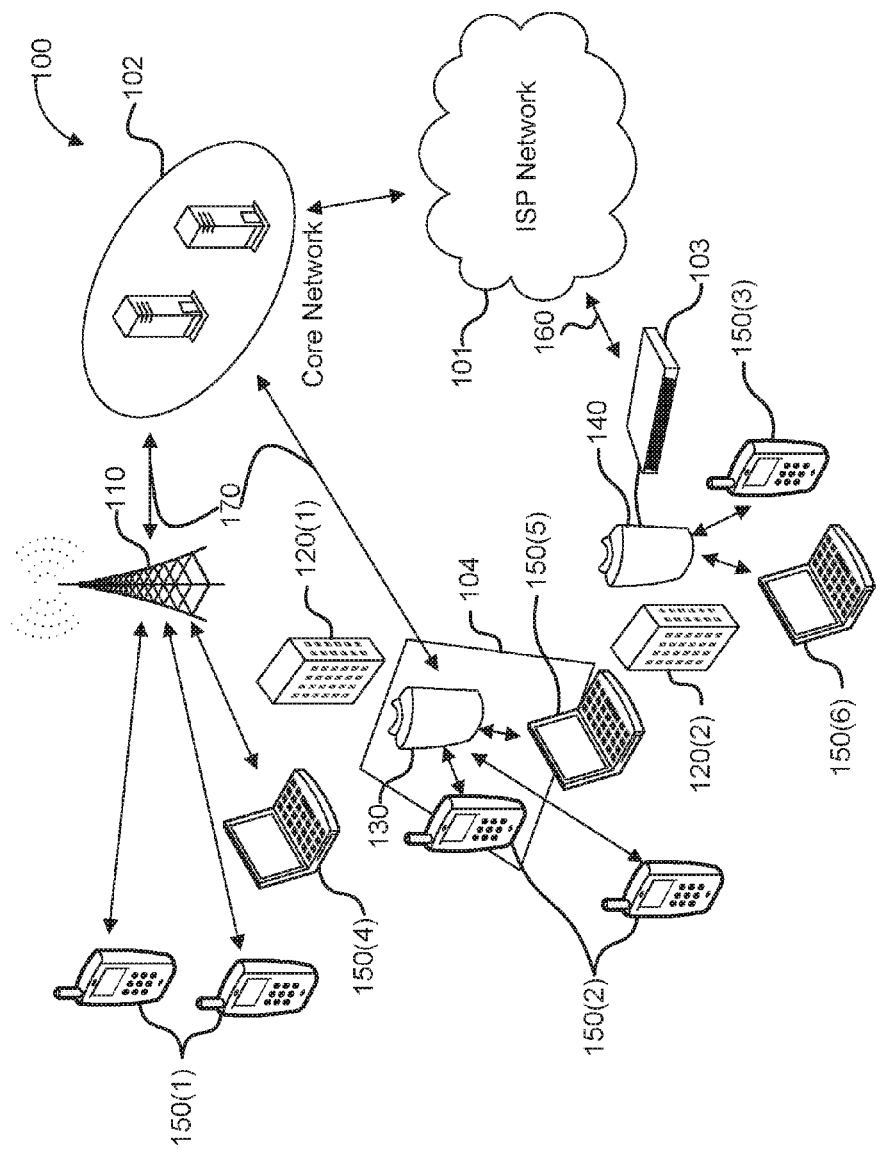
FIG. 1 is a diagram of a wireless communication network in accordance with aspects of the invention.

A user of a communication network may have an improved experience when equipment in the network is aware of applications associated with communications to and from the user. Example systems and methods that identify user applications and provide weight-based scheduling using that incorporates the application awareness are described in U.S. patent application Ser. No. 13/166,660, filed Jun. 22, 2011, and U.S. patent application Ser. No. 13/236,308, filed Sep. 19, 2011, which are hereby incorporated by reference. The example systems and methods may be used in communication networks that transport data streams associated with or generated by heterogeneous applications. Packet inspection may be used to classify data traffic by end-user application. The detection of application class and specific application, as described in the incorporated applications, may have further uses beyond use in the weight-based scheduling systems described in those applications. Although many of the following descriptions include application classes and specific applications, the systems and methods disclosed herein are more generally applicable including in systems with additional hierarchies of applications and in systems with a single level of applications such as a system that differentiates only application classes.

In a mobile system, a mobile user or subscriber may be handed over from a first network node to a second network node. That is, communication with the user switches from the first network node to the second network node. This may occur, for example, when the user relocates to a location nearer the second network node. When the network nodes use application class and specific application information, the application related information is transferred from the first network node to the second network node. The transfer between network nodes may be referred to as handoff, handover, or hand-in. Transferring the application information during the handover allows the second network node to utilize application information without having to re-identify the user applications. Since re-identifying the applications may require substantial time, transferring the information between network nodes avoids the handover causing a time gap where the application information is not available and thus not used. In some cases, re-identifying the applications requires substantial computational resources. For example, without the initial packets, every packet in a stream may need to be inspected to identify the application. In some cases, re-identifying an application may not be possible after handover, for example, when packets that would be used to identify the application are only communicated before the handover. Disruptions in the quality of the user experience that could occur on the handover are thus avoided when neighboring network nodes in a mobile wireless communication network are aware of each other's ability to use application information and the application information is passed between the network nodes.

The systems and methods disclosed herein are applicable to various wireless communication systems including cellular 2G, 3G, and 4G (including Long Term Evolution (LTE), LTE Advanced, and WiMax), WiFi, Ultra Mobile Broadband (UMB), and other wireless technologies. Although the phrases and terms used herein to describe specific embodiments may be associated with a particular technology or standard, the systems and methods described herein are generally not limited to any specific standard.

FIG. 1 is a diagram of a wireless communication network in which the systems and methods disclosed herein may be implemented according to an embodiment. FIG. 1 illustrates a typical basic deployment of a communication system that includes macrocells, picocells, and enterprise femtocells. In a typical deployment, the macrocells can transmit and receive on one or many frequency channels that are separate from the one or many frequency channels used by small form factor (SFF) base stations (including picocells and enterprise or residential femtocells). In other embodiments, the macrocells and the SFF base stations can share the same frequency channels. Various combinations of geography and channel availability create a variety of interference scenarios that can impact the throughput of the communications system.

FIG. 1 illustrates an example of a typical macrocell, picocell, and enterprise femtocell deployment in a communications network 100 in which the systems and methods disclosed herein may be implemented. A macro base station 110 is connected to a core network 102 through a backhaul connection 170. Subscriber stations 150(1) and 150(4) can connect to the network through the macro base station 110. Subscriber stations are sometimes referred to as mobile devices, mobile stations (MS), user equipment (UE), terminals, user devices, or simply users. In the network configuration illustrated in FIG. 1, an office building 120(1) causes a coverage shadow 104. A pico station 130 connected to the core network 102 via a backhaul connection 170 can provide coverage to subscriber stations 150(2) and 150(5) in the coverage shadow 104.

In an office building 120(2), an enterprise femtocell 140 provides in-building coverage to subscriber stations 150(3) and 150(6). The enterprise femtocell 140 can connect to the core network 102 via an Internet service provider (ISP) network 101 by utilizing a broadband connection 160 provided by an enterprise gateway 103.

Figure 2:
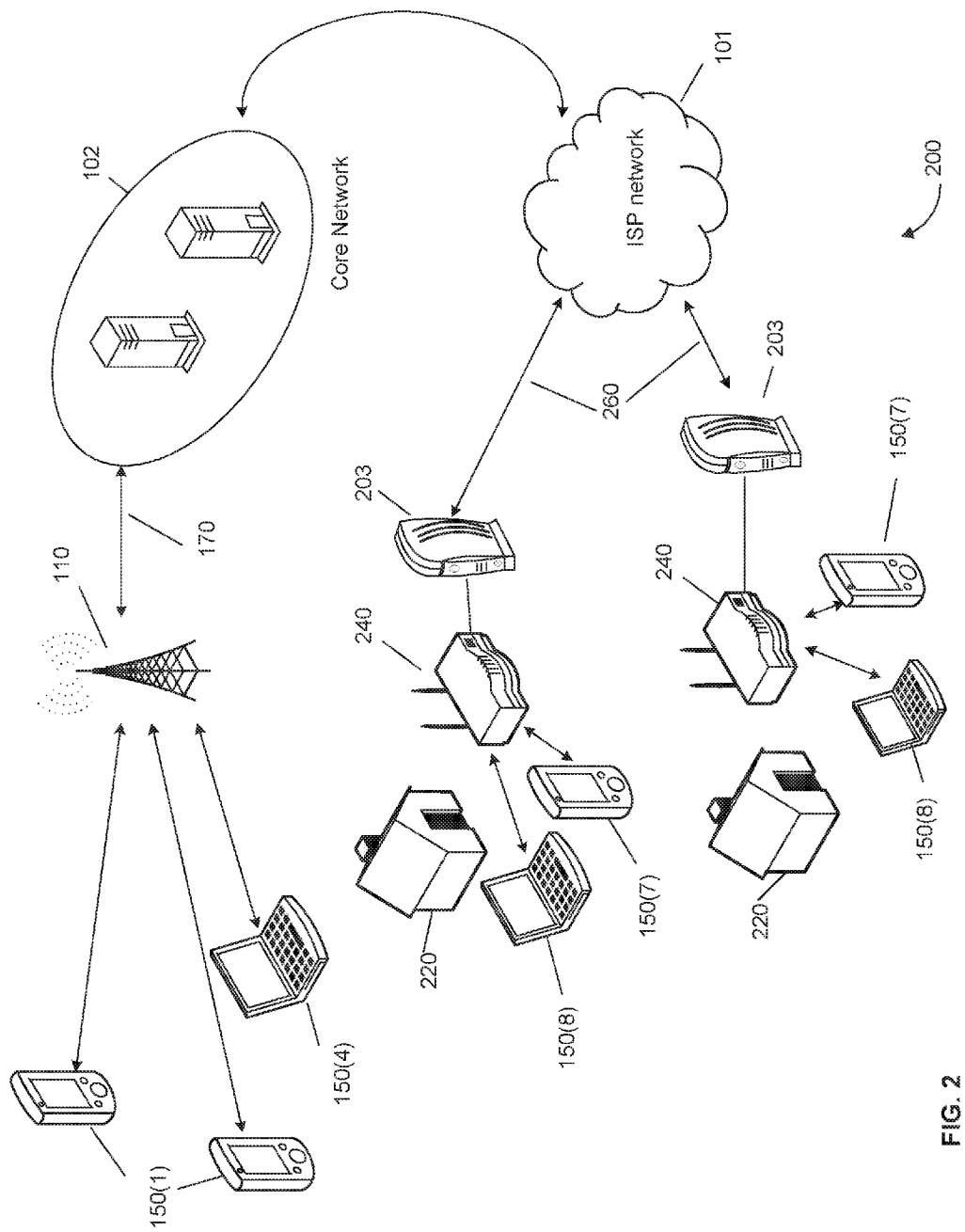
FIG. 2 is diagram of another wireless communication network in accordance with aspects of the invention.

FIG. 2 is a block diagram of another wireless communication network in which the systems and methods disclosed herein may be implemented according to an embodiment. FIG. 2 illustrates a typical basic deployment in a communications network 200 that includes macrocells and residential femtocells deployed in a residential environment. A macro base station 110 is connected to a core network 102 through a backhaul connection 170. Subscriber stations 150(1) and 150(4) can connect to the network through the macro base station 110. Inside residences 220, residential femtocells 240 can provide in-home coverage to subscriber stations 150(7) and 150(8). Residential femtocells 240 can connect to the core network 102 via an ISP network 101 by utilizing a broadband connection 260 provided, for example, by a cable modem or a DSL modem 203. The systems and methods disclosed herein are generally applicable to any base station or wireless access node, whether macro, pico, femto, or some other type, accordingly, the various terms used should be interpreted broadly unless the context requires otherwise.

Figure 3:
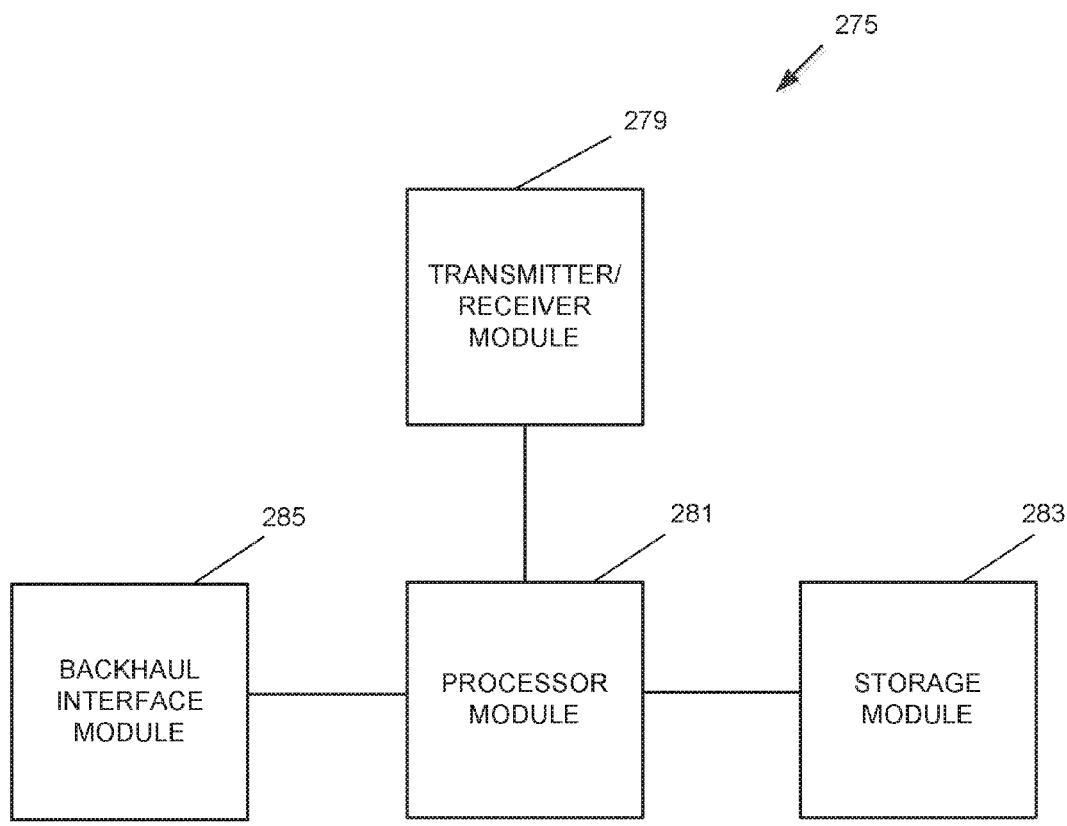
FIG. 3 is a functional block diagram of a wireless access node in accordance with aspects of the invention.

FIG. 3 is a functional block diagram of a wireless access node 275. In some embodiments, the wireless access node 275 is a mobile WiMAX base station, a GSM wireless base transceiver station (BTS), a UMTS NodeB, an LTE evolved Node B (eNB), or other wireless access node of any of many form factors (e.g., the macro base station 110, the pico station 130, the enterprise femtocell 140, or the residential femtocell 240 shown in FIGS. 1 and 2). The wireless access node 275 may also be termed a network node. The wireless access node 275 includes a processor module 281 coupled to a transmitter-receiver module 279, to a backhaul interface module 285, and to a storage module 283. The transmitter-receiver module 279 is configured to transmit and receive communications wirelessly with other devices. For example, the transmitter-receiver module 279 may be used to communicate with the various user devices shown in FIGS. 1 and 2. The transmitter-receiver module 279 may include circuitry such as amplifiers, tuners, modulators, and other signal processing circuitry. The wireless access node 275 generally includes or is coupled to one or more antennas for transmission and reception of radio signals. In many embodiments, the wireless access node 275 transmits and receives communications via another communication channel in addition to the transmitter-receiver module 279. For example, communications received via the transmitter-receiver module 279 may be transmitted, after processing, on a backhaul connection such as the backhaul 170 shown in FIG. 1. Similarly, communication received from the backhaul connection may be transmitted by the transmitter-receiver module 279. The backhaul interface module 285 includes circuitry for transmitting and receiving on the backhaul connection. In some embodiments, the backhaul interface module 285 provides communications for multiple logical interfaces. For example, the backhaul interface module 285 may be coupled to a backhaul connection to provide an LTE X2 logical interface to another wireless access node and an LTE S1 logical interface to a core network element.

The processor module 281 is used to process communications being received and transmitted by the wireless access node 275. The storage module 283 stores data for use by the processor module 281. The data may be stored, for example, in dynamic random-access memory. In some embodiments, the storage module 283 is also configured to store computer readable instructions for accomplishing the functionality described herein with respect to the wireless access node 275. In one embodiment, the storage module 283 includes a non-transitory machine readable medium. For example, the storage module 283 may store instructions in nonvolatile memory that are executed by the processor module 281 to process communications in the wireless access node 275. For the purpose of explanation, the wireless access node 275 or embodiments of it such as the macro base station 110, the pico station 130, the enterprise femtocell 140, or residential femtocell 240 shown in FIGS. 1 and 2, are described as having certain functionality. It will be appreciated that in some embodiments, this functionality is accomplished by the processor module 281 in conjunction with the storage module 283, transmitter-receiver module 279, and backhaul interface module 285.

Wireless data networks (e.g., networks providing Internet protocol (IP) communications) generally have minimal capability to reserve capacity for a particular connection or user, and therefore demand may exceed capacity. During periods of congestion, network devices must decide which data packets are allowed to travel on a network, i.e., which traffic is forwarded, delayed, or discarded. In an embodiment, such decisions may be made in the processor module 281. In a simple case, data packets are added to a fixed length queue, which may reside in the storage module 283, and sent on to the network as capacity allows. During times of network congestion, the fixed length queue may fill to capacity. Data packets that arrive when the queue is full are typically discarded until the queue is drained of enough data to allow queuing of more data packets. This first-in-first-out (FIFO) nature of the queue has a disadvantage of treating all packets as equally critical. This is undesirable as it ignores that different data packets have different packet delivery requirements, for example, based on the applications generating the traffic (e.g., voice, video, email, Internet browsing, etc.). Different applications degrade in different manners and with differing severity due to packet delay and/or discard.

To reduce the undesirable effects of the FIFO nature of queues, packets may be categorized into data streams (sometimes referred to as services or connections) that are then stored in multiple queues. The categorization may be based on criteria associated with the packets, for example, an application, a user, or a source IP address. The categorized streams may be given differing levels of importance or differently managed to provide differentiated levels of service. How the categorization is performed is typically configured by a network operator, for example, based on services the operator offers and to which its users have subscribed. For example, services may be categorized as voice, video-on-demand, and best effort or background data.

Categorization of data packets may be performed, for example, by the processor module 281 in the wireless access node 275 of FIG. 3. Categorization of data packets may be also performed, for example, by a core network element and signaled to the wireless access node 275. For example, in an LTE system the network operator may configure a packet gateway (P-GW) to segregate data onto separate data bearers prior to forwarding the data to an LTE eNB (a form of wireless access node). The data bearers are each mapped onto a tunnel. The mapping between a tunnel ID and a data bearer is made known to the eNB when the data bearer is initialized. Checking the tunnel identifier of packets received at the eNB from the P-GW (for example, through the backhaul interface module 285) allows the eNB to know the data categorization. Categorization of data packets may also be performed distributed across multiple devices in the work.

In many communication systems, the data streams may be assigned to a discrete number of scheduling groups, defined by one or more common characteristics of scheduling method, member data streams, scheduling requirements, or some combination thereof. For example, scheduling groups can be defined by a scheduling algorithm to be used on member data streams (e.g., scheduling group #1 may use a proportional fair algorithm, while scheduling group #2 uses a weighted round-robin algorithm). The term "class of service" (CoS) is sometimes used as a synonym for scheduling groups.

Alternatively, a scheduling group may be used to group data streams of similar applications (e.g., voice, video, or background data). For example, Cisco defines six scheduling groups to differentiate voice, video, signaling, background, and other data streams. In the case of Cisco products, this differentiation of application may be combined with unique scheduling algorithms applied to each scheduling group.

In another example, the Third Generation Partnership Program (3GPP) has established a construct termed QoS Class Identifier (QCI) for use in the LTE standard. The QCI system has nine scheduling groups defined by a combination of performance requirements, scheduler priority, and user application. For example, the scheduling group referenced by QCI index=1 is defined by the following characteristics:
  (1) Performance Requirements: Latency=100 ms, Packet Loss Rate=10E-2, Guaranteed Bit Rate
  (2) Priority: 2
  (3) Application: Conversational Voice In systems as described above, one or more data streams can be assigned an importance and a desired level of performance. This information may be used to assign packets from each data stream to a scheduling group and data queue. A scheduling algorithm may also use this information to decide which queues (and therefore which data streams and packets) to treat preferentially relative to others queues in both wired and wireless systems.

Schedulers that consider performance requirements are typically complex to configure, requiring substantial network operator knowledge and skill, and may not be implemented sufficiently to distinguish data streams from differing applications. This leads to the undesirable grouping of both high and low importance data streams in a single queue or scheduling group. Consider, for example, an IEEE 802.16 network. An uplink (UL) data stream (or service flow) can be defined using a network's gateway IP address (i.e., IP "source address"). In such a case, all data streams "behind" the router, regardless of application or performance requirements are treated the same by the WiMAX UL scheduler policies and parameters, such as weights.

There are numerous potential deficiencies of a priority-based system. The system used to assign priority may not be aware of the user application and in some cases cannot correctly distinguish among multiple data streams being transported to or from a specific user. The priority assignment is static and cannot be adjusted to account for changing network conditions. Priority information can be missing due to misconfiguration of network devices or even stripped due to network operator policy. The number of available priority levels can be limited, for example the IEEE 802.1p standard only allows eight levels. In addition there can be mismatches due to translation discrepancies from one standard to another as packets are transported across a communication system.

Figure 4:
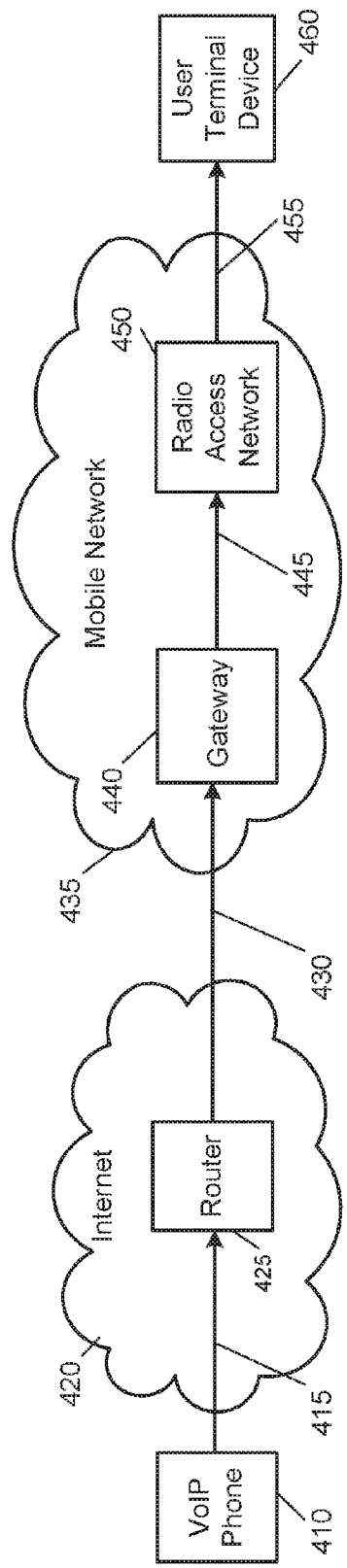
FIG. 4 is a block diagram of a wireless communication system in accordance with aspects of the invention.

FIG. 4 is a block diagram illustrating a wireless communication system according to an embodiment. In the system illustrated in FIG. 4, a Voice over IP (VoIP) phone 410 is connected to the Internet 420 via a communication link 415. Within the Internet 420 there exists one or more network routers 425 configured to direct traffic to the proper packet destination. In this example, Internet traffic is carried along link 430 into a mobile network 435. Traffic passes through a gateway 440 onto link 445 and into a Radio Access Network 450. The Radio Access Network 450 may, for example, include the wireless access mode 275 of FIG. 3. The output of the Radio Access Network 450 is typically a wireless, radio-frequency connection 455 linked to a user terminal 460, such as a cell phone.

A discrepancy between two different priority systems can exist in the example illustrated in FIG. 4. For example, a VoIP phone will often be configured to use the IEEE 802.1p or IETF RFC 2474 ("diffserv") packet marking prioritization system to mark packets with an elevated priority level indicating a certain level of desired treatment. In RFC 2474, for instance, such priority levels fall into one of three categories: default, assured and expedited. Within the latter two categories, there are subcategories relating to the desired, relative performance requirements. Packets generated by the VoIP phone will thus travel on communication links 415 and 430 with such a priority marking. When the packets arrive at the mobile network gateway 440, these priorities need to be translated into the prioritization system established within the mobile network. For example, in an LTE network, mapping to QCI may be performed. This conversion may create problems. For example, the diffserv information may be completely ignored. Or the diffserv information may be used to assign a QCI level inappropriate for voice service. Additionally, the diffserv information may be used to assign a QCI level that is less fine-grained than the diffserv level, thus assigning the VoIP packets the same QCI level as packets from many other applications.

Some systems have combined the concepts of priority and performance requirements in an effort to provide additional information to the scheduling system. For example, in 802.16 the importance of streams (or "services") is defined by a combination of priority value (based on packet markings such as 802.1p) and performance requirements. While a combined system such as 802.16 can provide the scheduler with a richer set of information, the deficiencies described above still apply.

The use of scheduling groups alone or in conjunction with the aforementioned techniques has numerous deficiencies in relation to end user Quality of Experience (QoE). For example, the available number of groups is limited in some systems which can prevent the fine-grained control necessary to deliver optimal QoE to each user. Additionally, some systems typically utilize a "best effort" group to describe those queues with the lowest importance. Data streams may fall into such a group because they are truly least important but also because such streams have not been correctly classified (intentionally or unintentionally), through the methods described above, as requiring higher importance.

An example of such a problem is the emergence of 'over-the-top' voice and video services. These services provide capability using servers and services outside of the network operator's visibility and/or control. For example, Skype and Netflix are two Internet-based services or applications which support voice or video two-way communication and video streaming, respectively. Data streams from these applications can be carried by the data service provided by wireless carriers such as Verizon or AT&T, to whom they may appear as non-prioritized data rather than being identified as voice or video. As such, the packets generated by these applications, when transported through the wireless network, may be treated on a 'best-effort' basis with no priority given to them above typical best-effort services such as web browsing, email or social network updates.

In order to meet performance requirements such as guaranteed bit rate (GBR) or maximum latency, scheduling weights, credits, or other related parameters may be adjusted upward for a particular data stream as its actual, scheduled throughput is reduced and approaches the guaranteed minimum limit. However, this adjustment of weights or credits does not take into account the effect of QoE on the end user. In this case, the increase of weight to meet GBR limit may result in no appreciable improvement in QoE, yet may create a large reduction in QoE for a competing queue with lower weight.

Figure 5:
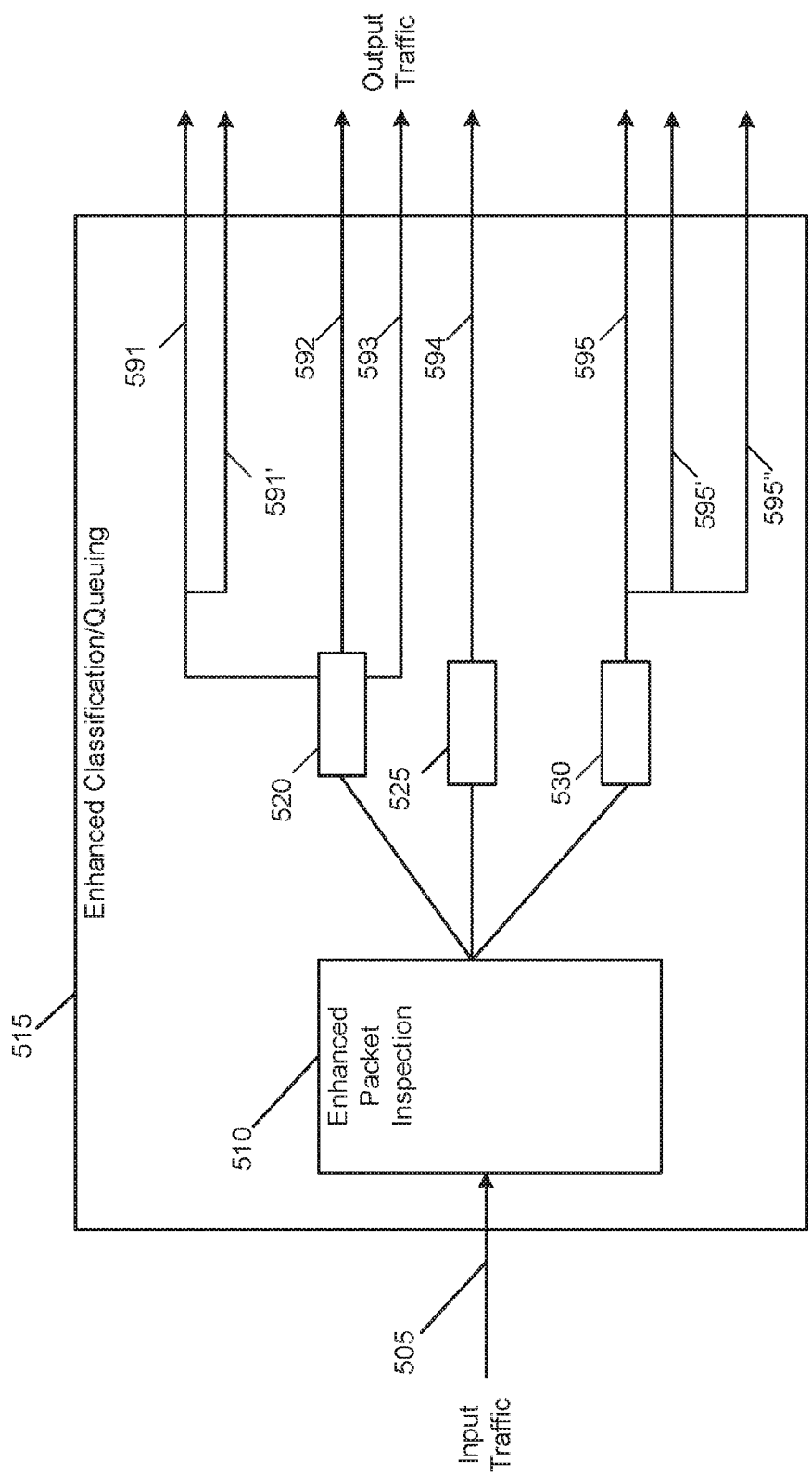
FIG. 5 is a functional block diagram and graphical representation of an enhanced classification and queuing system in accordance with aspects of the invention.

FIG. 5 is a functional block diagram and graphical representation of a classification and queuing system 515. The classification and queuing system 515 provides enhanced classification and queuing. The classification and queuing system 515 receives heterogeneous input traffic and directs the traffic to various queues for scheduling. The system may, in some embodiments, be implemented in the processor module 281 and the storage module 283 of the wireless access node 275 of FIG. 3.

Heterogeneous input traffic 505 is received by an enhanced packet inspection module 510 that characterizes each received packet to assess performance requirements and priority. The characterization preferentially is based on a combination of operator configured parameters (e.g., LTE data bearer tunnel identifiers) as well as information about the packets (e.g., the presence of Netflix or other streaming video) detected local to the wireless access node performing the characterization. In some embodiments, the characterization is based only on operator configured parameters or locally detected information about the packets. The enhanced packet inspection module 510 assigns each packet to one of three scheduling groups 520, 525, 530.

The packets can be assigned to a data queue (591, 592, 593, 594, 595) associated with one of the scheduling groups 520, 525, 530. Additionally, the enhanced packet inspection 510 module performs the enhanced packet inspection techniques described herein. As shown in FIG. 5, in some embodiments, the enhanced packet inspection module 510 generates additional data queues 591', 595', and 595". Packets can be assigned to a specific data queue associated with a scheduling group based on performance requirements, priority, additional user specific policy/service level agreement (SLA) settings, unique logical connections, or some combination thereof. In an alternate embodiment, the data queues are not subdivided into additional data queues, but a queue may be differentiated from other queues in the same or other scheduling groups by use of an application factor that adjusts weights, credits, priorities, or other scheduling parameters when the queue is known to transport data from a particular application type or specific application.

The classification and queuing module 510, in some embodiments, analyzes packets flowing in two directions, for example, from a client to a server and from the server to the client, and uses information from the packets flowing in one direction to classify the packets flowing in the other direction. The packet inspection module 510 may then receive input traffic from a second direction in addition to the heterogeneous input traffic 505 or may receive information from another inspection module that characterizes packets communicated in the second direction. While the embodiment illustrated in FIG. 5 includes three scheduling groups and eight data queues, other classification and queuing systems may include a greater or lesser number of scheduling groups and data queues.

In one example, an LTE eNB is configured to assign packets with a certain QCI to a particular scheduling group (e.g., packets with QCI=9 may be assigned to one scheduling group and packets with QCI=8 assigned to a different scheduling group). Furthermore, packets with QCI=9 may be assigned to individual queues based on user ID, bearer ID, SLA, or a combination thereof. For example, each LTE UE may have a default bearer and one or more dedicated bearers. Within the QCI=9 scheduling group, packets from the default bearers may be assigned to one queue and packets from the dedicated bearers may be assigned a different queue.

According to an embodiment, the functions illustrated in the classification and queuing system 515 of FIG. 5 are implemented in a single wireless access network node, such as a cellular base station, a WiMAX base station, an LTE eNB, or other network node (e.g., the macro base station 110, pico station 130, enterprise femtocell 140, or residential femtocell 240 of FIGS. 1 and 2). The enhanced classification and queuing module 515 can analyze the application class and/or the specific application of each packet and provide further differentiation of data packet streams that are grouped together by traditional classification and queuing methods.

According to an embodiment, the enhanced classification techniques disclosed herein can be implemented in the packet inspection module 510 of the enhanced classification and queuing module 515. For example, two-way video conferencing, unidirectional video streaming, online gaming, and voice are examples of some different application classes. Specific applications refer to the actual software used to generate the data stream traveling between source and destination. Examples of specific applications include YouTube, Netflix, Skype, and iChat. Each application class may have many specific applications.

According to an embodiment, the enhanced classification and queuing module 515 can inspect the IP source and destination addresses in order to determine the application class and specific application of the data stream. With the IP source and destination addresses, the enhanced classification and queuing module 515 can perform a reverse domain name system (DNS) lookup or Internet WHOIS query to establish the domain name and/or registered assignees sourcing or receiving the Internet-based traffic. The domain name and/or registered assignee information can then be used to establish both application class and specific application for the data stream based upon a priori knowledge of the domain or assignee's purpose. For example, if traffic with a particular IP address yielded a reverse DNS lookup or WHOIS query which included the name 'Youtube', this traffic stream could be considered unidirectional video streaming (application class) using the Youtube service (specific application). According to an embodiment, a comprehensive mapping between domain names or assignees and application class and specific application is maintained. For example, if more than one user device accesses Netflix, the enhanced classification and queuing module 515 may cache information and use the cached information so that the enhanced classification and queuing module 515 does not need to determine the application class and specific application for subsequent accesses to Netflix by the same user device or another user device. In an embodiment, this mapping is periodically updated to ensure that the mapping remains up to date.

According to another embodiment, the enhanced classification and queuing module 515 is configured to inspect the headers, the payload fields, or both of data packets associated with various communications protocols and to map the values contained therein to a particular application class or specific application. For example, according to an embodiment, the enhanced classification and queuing module 515 is configured to inspect the Host field contained in an HTTP header. The Host field typically contains domain or assignee information that, as described in the embodiment above, is used to map the stream to a particular application class or specific application. For example, an HTTP header field of "v11.lscache4.c.youtube.com" could be inspected by the Classifier and mapped to application class=video streaming, specific application=Youtube.

According to another embodiment, the enhanced classification and queuing module 515 is configured to inspect the 'Content Type' field within a Hyper Text Transport Protocol (HTTP) packet. The Content Type field contains information regarding the type of payload, based upon the definitions specified in the Multipurpose Internet Mail Extensions (MIME) format as defined by the Internet Engineering Task Force (IETF). For example, the following MIME formats would indicate either a unicast or broadcast video packet stream: video/mp4, video/quicktime, video/x-ms-wm. In an embodiment, the enhanced classification and queuing module 515 is configured to map an HTTP packet to the video streaming application class if the enhanced classification and queuing module 515 detects any of these MIME types within the HTTP packet.

In another embodiment, the enhanced classification and queuing module 515 is configured to inspect a protocol sent in advance of the data stream. For example, the enhanced classification and queuing module 515 is configured to identify the application class or specific application based on the protocol used to set up or establish a data stream instead of identifying this information using the protocol used to transport the data stream. According to an embodiment, the protocol sent in advance of the data stream is used to identify information about application class, specific application and characteristics that allow the transport data stream to be identified once initiated.

For example, in an embodiment, the enhanced classification and queuing module 515 is configured to inspect Real Time Streaming Protocol (RTSP) packets which can be used to establish multimedia streaming sessions. RTSP packets are often encapsulated within TCP/IP frames and carried across an IP network.

RTSP establishes and controls the multimedia streaming sessions with a client and a server exchanging messages. An RTSP message sent from the client to the server is a request message. The first line of a request message is a request line. The request line is formed with the following three elements: (1) Method; (2) Request-URI; and (3) RTSP-Version.

RTSP defines methods including OPTIONS, DESCRIBE, ANNOUNCE, SETUP, PLAY, PAUSE, TEARDOWN, GET_PARAMETER, SET_PARAMETER, REDIRECT, and RECORD. Below is an example of a message exchange between a client ("C") and a server ("S") using the method DESCRIBE. The response message from the server has a message body which is separated from the response message header with one empty line.

```
C->S: DESCRIBE rtsp://s.companydomain.com:554/dir/f.3gp RTSP/1.0
    CSeq: 312
    Accept: application/sdp
S->C: RTSP/1.0 200 OK
    CSeq: 312
    Date: 23 Jan 1997 15:35:06 GMT
    Content-Type: application/sdp
    Content-Length: 376
    v=0
    o=- 2890844526 2890842807 IN IP4 126.16.64.4
    s=SDP Seminar
    c=IN IP4 224.2.17.12/127
```

-continued

```
    t=2873397496 2873404696
    m=audio 49170 RTP/AVP 0
    m=video 51372 RTP/AVP 31
```

Request-URI in an RTSP message always contains the absolute URI as defined in RFC 2396 (T. Berners-Lee, et al., IETF RFC 2396, "Uniform Resource Identifiers (URI): Generic Syntax"). An absolute URI in an RTSP message contains both the network path and the path of the resource on the server. The absolute URI in the message listed above is rtsp://s.companydomain.com:554/dir/f.3gp.

RTSP-Version indicates which version of the RTSP specification is used in an RTSP message.

In one embodiment, the enhanced classification and queuing module 515 is configured to inspect the absolute URI in the RTSP request message and extract the network path. The network path typically contains domain or assignee information which, as described in the embodiment above, is used to map the stream to a particular application class or specific application. For example, an RTSP absolute URI "rtsp://v4.cache8.c.youtube.com/dir_path/video.3gp" could be inspected and mapped to application class=video streaming, specific application=Youtube. In one embodiment, the enhanced classification and queuing module 515 inspects packets sent from a client to a server to classify related packets sent from the server to the client. For example, information from an RTSP request message sent from the client may be used in classifying responses from the server.

The RTSP protocol may specify the range of playback time for a video session by using the Range parameter signaled in a request message using the PLAY method. The request may include a bounded (e.g., a start time and a stop time) range of time or an open-ended range of time (e.g., start time only). Time ranges may be indicated using either the normal play time (npt), smpte, or clock parameters. Npt time parameters may be expressed in either hours:minutes: seconds.fraction format or in absolute units per ISO 8601 format timestamps. Smpte time values are expressed in hours:minutes:seconds.fraction format. Clock time values are expressed in absolute units per ISO 8601 formatted timestamps. Examples of Range parameter usage are as follows:

```
    Range: npt=1:02:15.3-
    Range: npt=1:02:15.3 - 1:07:15.3
    Range: smpte=10:07:00-10:07:33:05.01
    Range: clock=19961108T142300Z-19961108T143520Z
```

In one embodiment, the enhanced classification and queuing module 515 is configured to inspect the RTSP messages and extract the Range information from a video stream using the npt, smpte, or clock fields. The npt, smpte, and clock parameters within an RTSP packet may use alternative syntaxes to communicate the information described above.

The RTSP protocol includes a DESCRIBE method that is used to communicate the details of a multimedia session between Server and Client. The RTSP response message to an RTSP request message with the DESCRIBE method contains a message body. The message body is based upon the Session Description Protocol (SDP is defined in RFC 4566 which supersedes RFC 2327) which specifies the content and format of the requested information. With SDP, the m-field defines the media type, network port, protocol, and format. For example, consider the following SDP media descriptions:

```
m=audio 49170 RTP/AVP 0
m=video 51372 RTP/AVP 31
```

In the first example, an audio stream is described using the Real-Time Protocol (RTP) for data transport to Port 49170 and based on the format described in the RTP Audio Video Profile (AVP) number 0. In the second example, a video stream is described using RTP for data transport to Port 51372 based on RTP Audio Video Profile (AVP) number 31.

In both RTSP examples, the m-fields are sufficient to classify a data stream to a particular application class. Since the m-fields call out a communication protocol (RTP) and a port number, the ensuing data stream or streams can be identified and mapped to the classification information just derived. However, classification to a specific application is not possible with this information alone.

The SDP message returned from the server to the client may include additional fields that can be used to provide additional information on the application class or specific application.

An SDP message contains the payload type of video and audio stream transported in RTP. Some RTP video payload types are defined in RFC 3551 ("RTP Profile for Audio and Video Conferences with Minimal Control"). For example, the payload type of an MPEG-1 or MPEG-2 elementary video stream is 32, and the payload type of an H.263 video stream is 34. However, the payload type of some video codecs, such as H.264, is dynamically assigned, and an SDP message includes parameters of the video codec. In one embodiment, the video codec information may be used in classifying video data streams and treating video streams differently based on video codec characteristics.

An SDP message may also contain an attribute "a=framerate:<frame rate>", which is defined in RFC 4566, that indicates the frame rate of the video. An SDP message may also include an attribute "a=framesize:<payload type number><width><height>", which is defined in 3GPP PSS (3GPP TS 26.234, "Transparent End-to-End Packet-switched Streaming Service, Protocols and Codecs"), to indicate the frame size of the video. For historical reasons, some applications may use non-standard attributes such as "a=x-framerate: <frame rate>" or "a=x-dimensions: <width><height>" to pass similar information as that in "a=framerate:<frame rate>" and "a=framesize:<payload type number><width><height>". In one embodiment, the enhanced classification and queuing module 515 is configured to inspect the SDP message and extract either the frame rate of the video, the frame size of the video, or both if the corresponding fields are present, and use the extracted information in mapping the stream to a particular application class or specific applications.

In one embodiment, the enhanced classification and queuing module 515 inspects network packets directly to detect whether these packets flowing between two endpoints contain video data carried using RTP protocol ("RTP: A Transport Protocol for Real-Time Applications") without inspecting the SDP message or any other message that contains information describing the RTP stream. This may happen, for example, when either the SDP message or another message containing similar information does not pass through the enhanced classification and queuing module 515. This may also happen when an implementation of the enhanced classification and queuing module 515 is configured to not inspect such messages. An RTP stream is a stream of packets flowing between two endpoints and carrying data using the RTP protocol, while an endpoint is defined by a (IP address, port number) pair.

Figure 6:
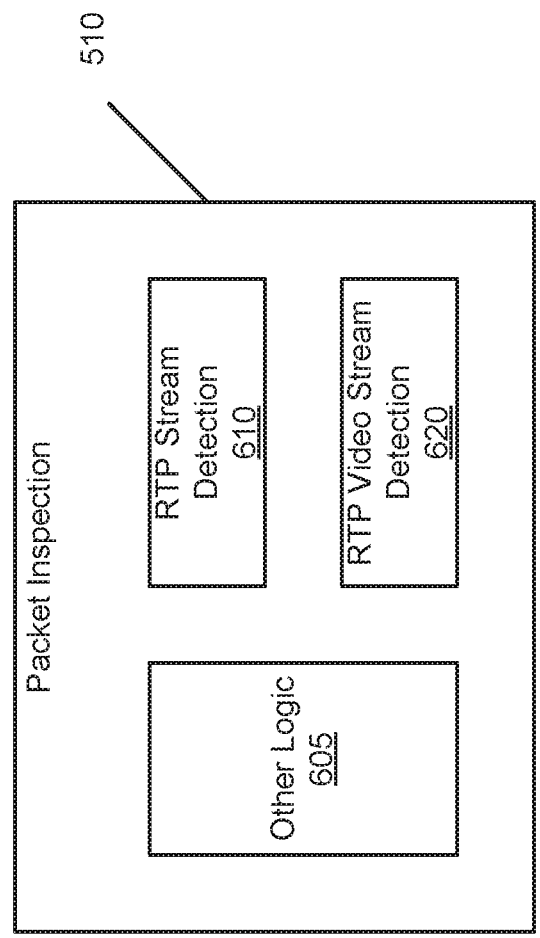
FIG. 6 a functional block diagram of a packet inspection module in accordance with aspects of the invention.

FIG. 6 is a functional block diagram of an embodiment of the enhanced packet inspection module 510. The enhanced packet inspection module 510 includes an RTP stream detection module 610 and a video stream detection module 620 for detecting whether either UDP datagrams or TCP segments contain video data transported using the RTP protocol. The enhanced packet inspection module 510 may also implement other functions which are generally represented by another logic module 605. In one embodiment, the enhanced packet inspection module 510 receives input traffic flowing in two directions and classifies the packets flowing one direction using information from the packets flowing in the other direction. The enhanced packet inspection module 510 may also receive information about the traffic flowing in the other direction from another packet inspection module rather than receiving the traffic itself.

The RTP stream detection module 610 parses the first several bytes of the payload of a UDP datagram or TCP segment according to the format of an RTP packet header and checks the values of the RTP header fields to determine whether the stream flowing between two endpoints is an RTP stream. The RTP header format does not depend on the media type carried in the RTP payload, while the RTP payload format is media type specific. If the payload of a UDP datagram or TCP segment contains an RTP packet, the values of several fields in the RTP header will have a special pattern. The RTP stream detection module 610 may use one of these patterns or a combination of these patterns in determining whether a stream is an RTP stream.

If a stream is detected to be an RTP stream, the video stream detection module 620 will perform further inspection on the RTP packet header fields and the RTP payload to detect whether the RTP stream carries video and which video codec generates the video stream.

The payload type of some RTP payloads related to video is defined in RFC 3551. However, for a video codec with dynamically assigned payload type, the codec parameters are included in an SDP message. However, that SDP message may not be available to the Video Stream Detection Module 620. If the video stream detection module 620 detects that payload type is dynamically assigned, it collects statistics regarding the stream. For example, statistics of values of the RTP header field "timestamp," RTP packet size, and RTP packet data rate may be collected. The video stream detection module 620 may then use one of the collected statistics or a combination of the statistics to determine whether the RTP stream carries video data.

A video stream usually has a well-defined frame rate, such as 24 frames per second (FPS), 25 FPS, 29.97 FPS, 30 FPS, or 60 FPS, etc. In one embodiment, the video stream detection module 620 detects whether an RTP stream carries video data at least partially based on whether values of the RTP packet timestamp change in integral multiples of a common frame temporal distance (which is the inverse of a common frame rate).

A video stream usually has a higher average data rate and larger fluctuation in the instantaneous data rate compared to an audio stream. In another embodiment, the video stream detection module 620 detects whether an RTP stream carries video data at least partially based on the magnitude of the average RTP data rate and the fluctuation in the instantaneous RTP data rate.

The RTP payload format is media specific. For example, an H.264 payload in an RTP packet always starts with a NAL unit header whose structure is defined in RFC 6184 ("RTP Payload Format for H.264 Video"). In one embodiment, the video stream detection module 620 detects which video codec generates the video data carried in an RTP stream at least partially based on the pattern of the first several bytes the RTP payload.

As described above, once enhanced classification has been completed, the enhanced classification and queuing module 515 can assign packets to an enhanced set of queues (e.g., queue 591 and queue 591' versus only queue 591) based on the additional information derived by the enhanced classification techniques described above. For example, in an embodiment, the packets can be assigned to a set of queues by application class, specific application, detected parameters of the packets' data stream, or combinations thereof.

In one embodiment, the enhanced classification and queuing module 515 is configured to use a scheduling group that includes unique queues for each application class. For example, an LTE eNB may assign all QCI=6 packets to a single scheduling group. But with enhanced queuing, packets within QCI=6 which have been classified as video chat may be assigned to one queue, while packets classified as voice may be assigned to a different queue, allowing differentiation in scheduling.

In another alternative embodiment, the enhanced classification and queuing module 515 is configured to use a scheduling group that includes unique queues for each specific application. For example, an LTE eNB implementing enhanced queuing may assign QCI=9 packets classified as containing a Youtube streaming video to one scheduling queue, while assigning packets classified as a Netflix streaming video to a different scheduling queue. Even though they are the same application class, the packets are assigned different queues in this embodiment because they are different specific applications.

In yet another embodiment, the enhanced classification and queuing module 515 is configured such that a scheduling group may consist of unique queues for each data stream. For example an LTE eNB may assign all QCI=9 packets to a single scheduling group. Based on enhanced classification methods described above, each data stream is assigned a unique queue. For example, consider an example embodiment with a scheduling group servicing five mobile phone users, each running two specific applications. In one embodiment, if the applications for each mobile device are mapped to the default radio bearer for the mobile device, this would result in five queues, one for each mobile device, carrying heterogeneous data using the original classification and queuing module. However, in one embodiment, ten queues are created by the enhanced classification and queuing module 515 in support of the ten data streams. In an alternative example, each of the five mobile devices has two data streams which use the same specific application. In this case, the data streams are also classified based on, for instance, port number or source IP address into separate queues resulting in ten queues. In an alternate embodiment, additional queues for each application are not created, but scheduling parameters are adjusted for queues containing data for streams which carry data from particular types of applications or specific applications.

One skilled in the art will recognize that the enhanced classification and queuing techniques described above can be used to improve the queuing in a wireless or wired network communication system. One skilled in the art will also recognize that the techniques disclosed herein can be combined with other methods for assigning packets to queues to provide improved queuing. This, in turn, leads to improved QoE or quality of service (QoS) to the users.

Some types of data, like video or audio, are consumed at a predefined playback time. If the data is delivered later than the time that the data should be consumed, this will result in a freeze in video playback or audio stuttering. On the other hand, if too much data is delivered before its playback time, this will result in extra buffering on the client side, and potential waste of bandwidth, if the user decides to stop playback before all the downloaded data is consumed.

The enhanced classification and queuing techniques described above can bring additional benefits of improving the overall system performance. In addition to detecting the application class and specific application of the data stream, the enhanced classification and queuing module 515 can monitor when the first packets for an application are transferred (start transfer time, Ts), and how much data is transferred (Nd) at a current time (Tc) from a wireless access node to a user device. The transfer time (Tt) can be calculated from Tc and Ts as Tt=Tc−Ts. By inspecting the payload in the packets, the enhanced classification and queuing module 515 is also able to extract information of the remaining playback time (Tp) of the data packet being transferred at current time (Tc). In one embodiment, the difference between the transfer time (Tt) and the remaining playback time (Tp) may be used as a parameter to the scheduler so that Tp−Tt>=Td (Td is an application dependent threshold to control buffer fullness in the client side) for each time-sensitive application. Overall system performance may be optimized by controlling Tp−Tt−Td for all applications. In an embodiment, the enhanced classification and queuing module 515 works to minimize Tp−Tt−Td.

Many of the enhanced inspection techniques described above are complex in nature and may require inspection of data over a certain time period in order to make a decision, for example, when patterns in the data are being detected. Some inspection methods rely on information that may not be persistent such as inspecting the protocol for setup of a service to determine the application class or specific application or other parameters which may impact enhanced classification and queuing. Unlike parameters configured by the operator, the results of enhanced packet inspection are local to the wireless access node that currently communicates with a particular user device.

Figure 7:
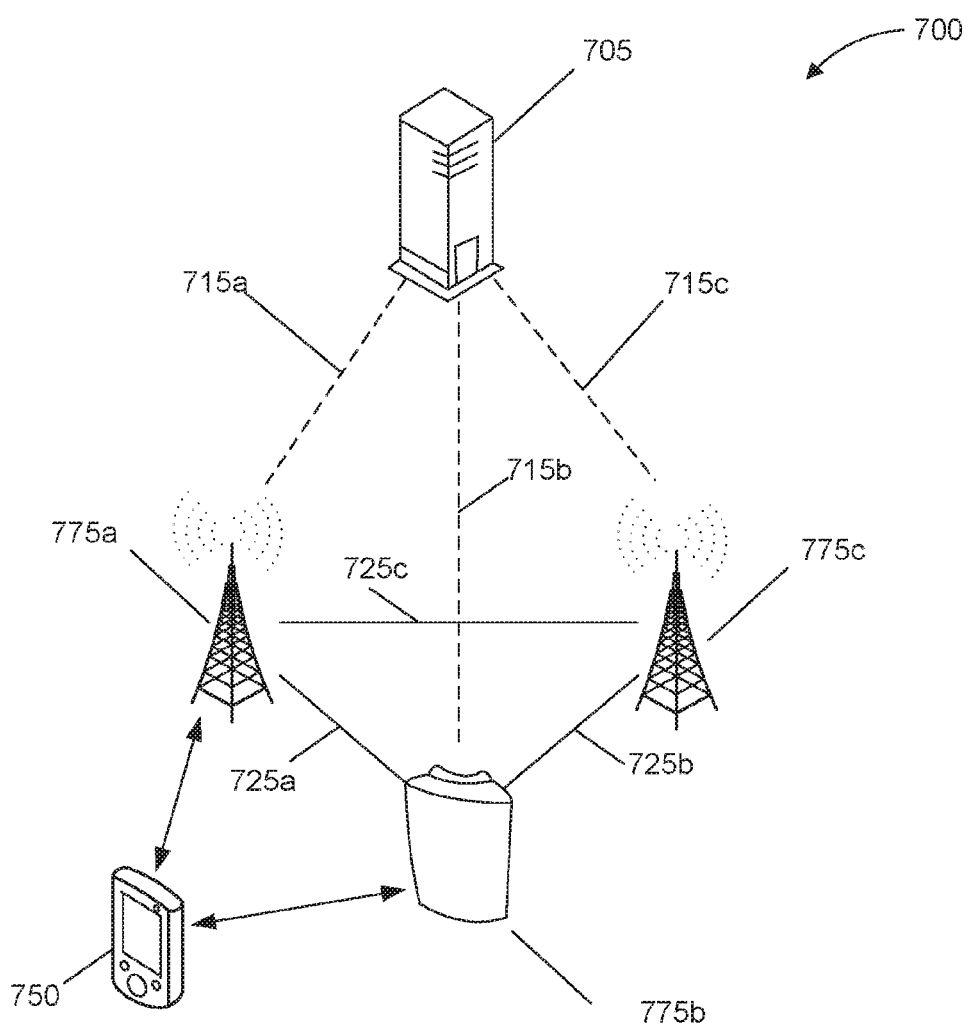
FIG. 7 is diagram of a wireless communication network in accordance with aspects of the invention.

FIG. 7 is diagram of a simplified wireless communication network 700. The wireless communication network 700 shown in FIG. 7 can represent a portion of the networks shown in FIGS. 1 and 2. The network includes a first wireless access node 775a, a second wireless access node 775b, and a third wireless access node 775c. The wireless access nodes 775 may be any variety of wireless access node, for example, the macro base station 110, the pico station 130, or the enterprise femtocell 140 of the wireless communication network of FIG. 1 or the residential femtocell 240 of the wireless communication network of FIG. 2. A core network element 705 communicates with the wireless access nodes 775 over backhaul communication links 715. The backhaul communication links 715 may include, for example, the LTE S1 logical interface.

The core network element 705 is a piece of equipment in a core network. For example, the core network element 705 may be, in various embodiments, a WiMAX Access Service Network (ASN) gateway, an LTE serving gateway (S-GW), or an LTE Mobility Management Entity (MME). The wireless access nodes 775 may communicate with each other via the backhaul communication links 715. Since this communication is via the core network element 705, it is considered indirect. In some embodiments, the wireless communication network 700 includes direct communication links 725 that couple the wireless access nodes 775. Although the backhaul communication links 715 and the direct communication links 725 are logically separate, in many embodiments, they share a physical connection. The direct communication links 725 may be truly direct communication links between pairs of the wireless access nodes 775. Alternatively, the direct communication links 725 may provide communications between the wireless access nodes 775 with the communications passing through another device, such as a router. In an embodiment, the direct communication links 725 may also communicate through the router. The direct communication links 725 are considered direct links in this context and differentiated from the backhaul communication links 715 in that communications over the direct communication links 715 are not processed, e.g., received and retransmitted, by the core network element 705. The direct communication links 725, for example, may be, in various embodiments, the LTE X2 logical interface or the WiMAX R8 interface. Additionally, the communication links may be wireless links. The backhaul communications links 715 and the direct communications links 725 may be provided, for example, by the backhaul interface module 285 in the wireless access node 275 shown in FIG. 3. It should be appreciated that FIG. 7 illustrates a simple wireless communication network for ease of explanation and that other wireless communication networks may have many additional elements.

Also shown in the wireless communication network 700 of FIG. 7 is a user equipment 750. The user equipment 750 normally communicates with only a single one of the wireless access nodes 775 at any given time. The user equipment 750 may considered to be attached to the wireless access nodes that it communicates with. However, the user equipment 750 may at some times be located where it is able to communicate with multiple wireless access nodes 775. When the user equipment 750 is a mobile device, such as a cellular phone, it may transition, for example, from having a better communication signal with the first wireless access node 775a to having a better communication signal with the second wireless access node 775b. When such a transition occurs, the user equipment 750 may handover from the first wireless access node 775a to the second wireless access node 775b. When handover occurs, certain information may be passed from the first wireless access node to the second wireless access node to facilitate communications with the user equipment 750 passing through the second wireless access node. The information that passes between the wireless access nodes 775 may include, for example, user equipment identification and authentication information, encryption and security information, untransmitted data, and transmitted but not yet acknowledged data.

When the user equipment 750 performs handover from the first wireless access node 775a to the second wireless access node 775b, there is a benefit to communicating information about characteristics of the user's data streams from the first wireless access node 775a to the second wireless access node 775b. For example, the second wireless access node 775b may not be able to learn the characteristics of the user's data streams. This may occur, for example, when the characteristics are signaled once at the beginning of the stream (as with HTTP progressive download) or prior to the stream (as with RTSP streaming). In the previous scenario, if the first wireless access node communicates the characteristics of the user's data streams to the second wireless access node, then the second wireless access node is able to perform enhanced queuing and other methods to improve the differentiation of treatment of data packets streams as described above.

The data stream characteristics are communicated from the first wireless access node 775a to the second wireless access node 775b over a communication path. If the direct communication path 725a exists between the first wireless access node 775a and the second wireless access node 775b, then the direct communication path 725a may be preferentially chosen. If a direct communication path does not exist between the first and second wireless access nodes or is otherwise unusable, an indirect path through the core network element 705 is chosen.

In an embodiment, the first wireless access node 775a queries the second wireless access node 775b to determine its enhanced inspection, classification, and queuing capabilities. The query may be made at the time of handover or may be made prior to handover, for example, during wireless access node initialization or following periodic updates to a wireless access node neighbor list. If the second wireless access node 775b is capable of making use of detected data stream characteristics, the first wireless access node 775a transfers the characteristics it has to the second wireless access node 775b.

In one embodiment, the first wireless access node 775a stores packets that contain information about the characteristics of an application and transfers the packets to the second wireless access node 775b on handover. The stored packets may be, for example, packets containing setup information about a data stream or packets saved for statistical analysis. The second wireless access node 775b may again store the forwarded packets and any additional packets containing information about the characteristics of the application that it receives directly from the server. The second wireless access node 775b extracts characteristics of the application from these packets, for example, using the enhanced classification techniques described above. When the user equipment 150 moves away from the second wireless access node 775b to the third wireless access node 775c, the second wireless access node 775b may forward these packets to the third wireless access node 775c, and so on.

In an embodiment, the enhanced classification and queuing module 515 of FIG. 5 is part of the wireless access nodes 775 and is configured to inspect Real Time Streaming Protocol (RTSP) packets that can be used to establish multimedia streaming sessions. The first wireless access node 775a may buffer all RTSP request and response messages that contain the characteristics of the application. Examples of such messages include RTSP request messages from the client to the server with DESCRIBE and SETUP methods and the corresponding response messages from the server to the client. In another example, the enhanced classification and queuing module 515 is configured to inspect HTTP packets which can be used to establish HTTP-based multimedia transport sessions. In an application using HTTP progressive download to transport video, the HTTP request message contains information about the URL of the video stream and the host, and the response message may include information such as the video container file format and the video stream length. During user equipment handover, the first wireless access node 775a may forward the entire HTTP headers of both the HTTP request and response message to the second wireless access node 775b. In an application using an HTTP streaming technology, such as Apple HTTP Live Streaming, Microsoft Smooth Streaming, Adobe HTTP Dynamic Streaming, MPEG/3GPP DASH (Dynamic Adaptive Streaming over HTTP), or other variants, playlist files or manifest files are transferred from the server to the client to provide the information about the HTTP streaming session. During user equipment handover, the first wireless access node may forward the playlist or the manifest file to the second wireless access node. Additionally, the HTTP headers of both the HTTP request and response message for a movie segment currently being transported may be forwarded from the first wireless access node to the second wireless access node.

A handover is often triggered when certain predefined conditions are met. For example, the handover is often started when the signal from the second wireless access node is stronger than the signal from the first wireless access node by at least a certain amount. It may be possible that when the handover conditions are met, a streaming session is being established. For example, in an application that uses RTSP streaming, the handover conditions may be met after some RTSP messages are exchanged but before the complete session is established. In another example, when the handover conditions are met, one RTSP message that is fragmented into multiple TCP segments may be only partially transferred. In one embodiment, the wireless access node may delay handover until the complete message is transferred or until the streaming session is established. In another embodiment, the first wireless access node may transfer the messages or partial messages to the second wireless access node.

In an alternative embodiment, the first wireless access node transfers any of the characteristics identified above such as presence of an application class or specific application in a data stream or bearer. The transferred characteristics may include information necessary to continue detecting packets with particular characteristics. Example transferred characteristics include source addresses, destination addresses, port identifiers, diffserv markings, reverse DNS lookup results, WHOIS query results, HTTP header contents, RTSP message contents, protocol types (e.g., RTP over TCP or UDP), video types (e.g., H.264), transfer times, remaining durations, session durations, frame rates, frame sizes, frame dimensions, and codecs.

For example, when an RTSP video streaming session with video and audio streams being transported through RTP over UDP is started while the user device 750 is attached to the first wireless access node 775a, the first wireless access node detects the start of the video streaming session. The first wireless access node also detects the server information, destination IP address, and destination port numbers for the video and audio streams. When the user device is handed over from the first wireless access node 775a to the second access wireless node 775b, the first wireless access node will send the application class (which is RTSP streaming), the server information, the destination IP address, and the destination port numbers for the video and audio streams to the second wireless access node. The information is sent through either the indirect communication link 715a or the direct communication link 725a. The second wireless access node will be able to identify the packets that belong to the same video streaming session and treat these packets similarly to how the packets of the video streaming session were treated while passing through the first wireless access node even though the second wireless access node does not receive and analyze the RTSP packets.

For another example, when the user device 750 starts a video playback using HTTP progressive download when the user device is attached to the first wireless access node 775a, the first wireless access node detects the start of the video playback session. In addition, the first wireless access node detects the IP address of the user device and destination port number of the video stream. When the user device is handed over from the first wireless access node 775a to the second wireless node 775b, the first wireless access node will send the application class (which is HTTP progressive download), the server information (which contains the information of a specific application), the IP address of the user device, and the destination port number. The second wireless access node will be able to identify the packets that belong to the same HTTP progressive download session and apply the same preferential treatment on these packets. In these examples, only the information about application class and specific application and the information necessary for identifying the packets are transferred. Additional information about the specific session described above may be transferred in other embodiments.

Historical information may also be transferred to the second wireless access node. The historical information may include statistical information such as the observed data rate of a stream or application or an observed group of pictures (GOP) structure for a video stream. Information may also include an estimate of the historical stream quality while the stream was being carried by the first wireless access node. The historical stream quality may be based on characteristics such as communication channel quality (e.g., receive power level, SNR, CINR, Eb/No, BER, or BLER) or packet transmission performance (e.g., packet delay, jitter, retransmissions, or discards). In an embodiment, the historical information may be used as an input to a packet scheduler to prioritize certain user streams over others. For example, if two streaming videos are competing for limited channel capacity, the scheduler may give a higher priority to the stream that had historically better quality, thus maintaining a consistent QoE. In a further embodiment, the historical stream quality may be used by the second wireless access node to consistently implement duration neglect and recency effect techniques.

Alternatively, or in addition, the historical information can include knowledge that the user, while not currently engaged in a particular application, has been previously and is, therefore, likely to do so again.

In addition to data stream characteristics, the first wireless access node may transfer information regarding the detection method used to determine a data stream's characteristics and contents. The second wireless access node may use the received information to configure ongoing detection. For example, it may be useful to the second wireless access node to know that a particular stream's characteristics were detected by inspecting a setup protocol, such as RTSP or IMS signaling, versus direct inspection of the stream's data packets.

In one embodiment, the first wireless access node transfers historical information of data transfer about an application to the second wireless access node upon handover. One example of the historical information is the transfer time (Tt) described above. The second wireless access node can use the historical information to continue estimating the client buffer fullness in order to optimize the overall system performance.

In some wireless networks, data at the first wireless access node destined for a particular user equipment but not yet transmitted, may be forwarded to the second wireless access node upon handover of the user equipment from the first to the second wireless access node. The not-yet-transmitted data may be communicated via the backhaul communication links 715 or the direct communication links 725.

In LTE systems, for example, data bearers can operate in an acknowledged mode or an unacknowledged mode. When a user equipment performs handover from a first wireless access node to a second wireless access node, any data not yet transmitted for data bearers operating in the acknowledged mode is forwarded from the first wireless access node to the second wireless access node and data for data bearers operating in the unacknowledged mode is discarded. Whether a data bearer operates in acknowledged mode or unacknowledged mode is established when the bearer is setup and may be decided by the LTE eNB. Acknowledged mode bearers use more overhead and have more delays than unacknowledged mode bearers but are more reliable due to the acknowledgements and retransmissions. Accordingly, a bearer providing voice service may operate in the acknowledged mode while a default bearer may operate in the unacknowledged mode, relying on the application to choose TCP if it needs high reliability or UDP if it gives preference to low latency.

Many protocols, such as TCP, UDP, and IP, were not designed assuming handover in a wireless environment. In an embodiment, the enhanced packet inspection module 510 identifies packets from application classes or specific applications that would benefit from being forwarded during a handover. The first wireless access node forwards the identified packets to the second wireless access node when the user equipment performs handover, thereby improving continuity of data and reducing data loss and/or data retransmission. Additionally, packets that would normally be forwarded may be discarded if packet inspection determines there is no or limited benefit to forwarding them.

In an alternative embodiment, when the enhanced packet inspection module 510 identifies packets from application classes or specific applications that would benefit from being forwarded during a handover, the wireless access node may change a data bearer from the unacknowledged mode to the acknowledged mode if practical in the wireless system in which it is operating.

Those of skill will appreciate that the various illustrative logical blocks, modules, units, and algorithm steps described in connection with the embodiments disclosed herein can often be implemented as electronic hardware, computer software, or combinations of both. To clearly illustrate this interchangeability of hardware and software, various illustrative components, units, blocks, modules, and steps have been described above generally in terms of their functionality. Whether such functionality is implemented as hardware or software depends upon the particular system and design constraints imposed on the overall system. Skilled persons can implement the described functionality in varying ways for each particular system, but such implementation decisions should not be interpreted as causing a departure from the scope of the invention. In addition, the grouping of functions within a unit, module, block, or step is for ease of description. Specific functions or steps can be moved from one unit, module, or block without departing from the invention.

The various illustrative logical blocks, units, steps and modules described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, or microcontroller. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm and the processes of a block or module described in connection with the embodiments disclosed herein can be embodied directly in hardware, in a software module (or unit) executed by a processor, or in a combination of the two. A software module can reside in RAM memory, flash memory, ROM memory, EPROM memory, EEPROM memory, registers, hard disk, a removable disk, a CD-ROM, or any other form of machine or computer readable storage medium. An exemplary storage medium can be coupled to the processor such that the processor can read information from, and write information to, the storage medium. In the alternative, the storage medium can be integral to the processor. The processor and the storage medium can reside in an ASIC.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter, which is broadly contemplated by the present invention. It is further understood that the scope of the present invention fully encompasses other embodiments that may become obvious to those skilled in the art.

What is claimed is:
1. A wireless access node, comprising:
   a transmitter-receiver circuit configured to wirelessly communicate with a user device;
   a backhaul interface circuit configured to communicate with a core network element, the communication with the core network element including receiving data packets from the core network element in a data stream for transmission to the user device; and
   a processor circuit coupled to the transmitter-receiver circuit and the backhaul interface circuit and configured to:
      inspect one or more fields of the received data packets to obtain information to improve a quality of experience metric associated with the data stream for a user of the user device, the obtained information including information to estimate a fullness level of a video client buffer in the user device,
      schedule the received data packets in the data stream differently from other data packets based on the obtained information, determine that the user device will be handed off to a second wireless access node, and transfer the obtained information to the second wireless access node.

2. The wireless access node of claim 1, wherein, in the scheduling step, the received data packets in the data stream are scheduled differently from other data packets to control the fullness level of the video client buffer in the user device.

3. The wireless access node of claim 1, wherein obtaining the information to improve the quality of experience metric associated with the data stream for the user of the user device comprises analyzing the received data packets in the data stream to determine one or more data stream characteristics associated with the data stream.

4. The wireless access node of claim 1, wherein the processor circuit is further configured to delay the hand off of the user device to the second wireless access node to improve the quality of experience metric associated with the data stream for the user of the user device.

5. The wireless access node of claim 4, wherein the hand off is delayed when the wireless access node has transmitted only some of the received data packets of a message to the user device.

6. The wireless access node of claim 1, wherein the obtained information to improve the quality of experience metric associated with the data stream further comprises information about applications previously used by the user device.

7. The wireless access node of claim 1, wherein the obtained information to improve the quality of experience metric associated with the data stream further comprises some of the data packets used to improve the quality of experience metric when transferred to the second wireless access node.

8. A method for use in a first wireless access node in a wireless communication network, the method comprising:
receiving data packets from a core network element in a data stream at the first wireless access node for transmission to a user device;
inspecting, by the first wireless access node, one or more fields of the received data packets to obtain information to improve a quality of experience metric associated with the data stream for a user of the user device, the obtained information including information to estimate a fullness level of a video client buffer in the user device;
scheduling the received data packets in the data stream differently from other data packets based on the obtained information;
determining that the user device will be handed off to a second wireless access node; and
transferring the obtained information from the first wireless access node to the second wireless access node.

9. The method of claim 8, wherein, in the scheduling step, the received data packets in the data stream are scheduled differently from other data packets to control the fullness level of the video client buffer in the user device.

10. The method of claim 8, wherein obtaining the information to improve the quality of experience metric associated with the data stream for the user of the user device comprises analyzing the received data packets in the data stream to determine one or more data stream characteristics associated with the data stream.

11. The method of claim 8, further comprising delaying the hand off of the user device to the second wireless access node to improve the quality of experience metric associated with the data stream for the user of the user device.

12. The method of claim 11, wherein the hand off is delayed when the first wireless access node has transmitted only some of the received data packets of a message to the user device.

13. The method of claim 8, wherein the obtained information to improve the quality of experience metric associated with the data stream further comprises information about applications previously used by the user device.

14. The method of claim 8, wherein the obtained information to improve the quality of experience metric associated with the data stream further comprises some of the data packets used to improve the quality of experience metric when transferred to the second wireless access node.

* * * * *